(12) United States Patent
Nakahara et al.

(10) Patent No.: US 6,383,964 B1
(45) Date of Patent: May 7, 2002

(54) CERAMIC MEMBER RESISTANT TO HALOGEN-PLASMA CORROSION

(75) Inventors: Masahiro Nakahara; Yumiko Itoh, both of Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/450,162

(22) Filed: Nov. 29, 1999

(30) Foreign Application Priority Data

| Nov. 27, 1998 | (JP) | 10-337224 |
| Dec. 28, 1998 | (JP) | 10-371726 |
| Jul. 30, 1999 | (JP) | 11-217013 |
| Nov. 19, 1999 | (JP) | 11-330093 |

(51) Int. Cl.$^7$ ............................................. C04B 35/505
(52) U.S. Cl. ..................... 501/152; 501/127; 501/105
(58) Field of Search ................. 501/105, 127, 501/152

(56) References Cited

U.S. PATENT DOCUMENTS

| 3,833,389 | A | * | 9/1974 | Komeya et al. | 501/98.4 |
| 5,296,421 | A | * | 3/1994 | Nishida et al. | 501/105 |
| 5,409,871 | A | * | 4/1995 | Dodds et al. | 501/127 |
| 5,484,752 | A | * | 1/1996 | Waku et al. | 501/127 |
| 5,569,547 | A | * | 10/1996 | Waku et al. | 501/127 |
| 5,580,837 | A | * | 12/1996 | Dodds et al. | 501/152 |
| 5,902,763 | A | * | 5/1999 | Waku et al. | 501/127 |
| 5,981,415 | A | * | 11/1999 | Waku et al. | 501/127 |
| 6,139,983 | A | * | 10/2000 | Ohashi et al. | 428/698 |
| 6,326,076 | B1 | * | 12/2001 | Takai | 501/127 |

FOREIGN PATENT DOCUMENTS

| JP | 62-103380 | 5/1987 |
| JP | 03-217016 | 9/1991 |
| JP | 08-091932 | 4/1996 |
| JP | 10-045467 | 2/1998 |
| JP | 10-236871 | 9/1998 |

* cited by examiner

Primary Examiner—Karl Group
(74) Attorney, Agent, or Firm—Hogan & Hartson, L.L.P.

(57) ABSTRACT

The present invention is to provide ceramic members for being used as members constituting a processing chamber for etching or cleaning semiconductor substrates or wafers by halogen plasma. A ceramic member includes at least 10% by volume of a compound of yttrium-aluminum-garnet (YAG) phase and not more than 90% by volume of at least an oxide phase selected from aluminum oxide, yttrium oxide and aluminum nitride. Particularly, the ceramic member contains yttrium within a range of 35 to 80 mole % in terms of yttrium oxide $Y_2O_3$ and aluminum within a range of 20 to 65 mole % in terms of aluminum oxide $Al_2O_3$ to form a mixture of YAG phase with yttria phase, producing ceramic material having high corrosion resistance to halogenous gas and its plasma. Such ceramic material may be well applicable to members to be exposed by the halogen plasma, for example, a chamber wall, a wafer stage, a clamp ring, a shower head, which are used in systems for etching and cleaning semiconductor wafers. A ceramic member of the invention can also be composed of YAG and alumina or aluminum nitride, showing high thermal conductivity enough to prevent a deposit of the reaction products of halide over the whole members in the chamber by external heating.

6 Claims, 1 Drawing Sheet

CERAMIC MEMBER RESISTANT TO HALOGEN-PLASMA CORROSION

BACKGROUND OF THE INVENTION

1. The Field of the Invention

The present invention relates to a ceramic member which exhibits high corrosion resistance to halogenous-corrosive gases or plasma thereof. More particularly, the present invention relates to such a corrosion-resistant ceramic member used in a system utilizing halogen plasma for producing semiconductor devices.

2. Prior Art

Recently, there have been developed systems utilizing halogen plasma, for example, for plasma processing including plasma dry etching or plasma coating adopted in production processes of semiconductor devices, and for discharge lamps, metal halide lamps and the like. With respect to a plasma process for producing semiconductor devices, a large variety of high-reactive halogenous-corrosive gases, containing fluorine, chlorine, etc. have been used for the etching and cleaning of semiconductor substrates. Since these gases and plasma thereof corrode members in the processing systems, the members used in these purposes require high corrosion resistance to halogenous plasma.

FIG. 1 shows an example of a processing chamber used for halogen-plasma etching or cleaning systems for producing semiconductor devices. This chamber includes a chamber wall 1, with a high frequency induction coil 6 arranged on the outside of the chamber to generate plasma. A shower head 2 is fixed at the upper portion inside the chamber wall 1 to supply a gas mixture containing a halogen gas into the chamber, and a lower electrode 4, or a stage, is arranged at the lower portion in order to fix and mount a wafer 5 to be processed thereon. Furthermore, a clamp ring 3 for fixing the wafer 5 is mounted on the lower electrode.

Except for work pieces such as the semiconductor wafer to be processed, the members such as chamber wall 1, shower head 2 and clamp ring 3 have been made of corrosion-resistant material such as quartz, stainless steel, alumina or the like. Also, there have been utilized sintered materials of alumina or aluminum nitride, and materials obtained by coating these ceramic sintered materials with a ceramic film of silicon carbide (see JP(B)-5-53872, JP(A) 3-217016 and JP(A)8-91932).

However, quartz glass conventionally used is drastically consumed in halogen plasma because of poor corrosion resistance thereto. Particularly, quartz glass is etched by fluorine or chlorine plasma on the surface. Quartz glass, which is often required to be high in transparency, is easily hazed into white on the surface by the plasma, then, losing its transparency.

A member made of a metal such as stainless steel has also low corrosion resistance to halogen plasma, then causing the problem that the wafer while being processed is contaminated by generation of metal halide particles attended with the corrosion.

Sintered materials of aluminum oxide or aluminum nitride, or ceramic materials obtained by coating this sintered material with a ceramic film of silicon carbide is higher in corrosion resistance to halogenous plasma as compared with quartz glass or corrosion-resistant metals. However, when they are exposed to plasma, halides are evaporated and consumed from surfaces of the aluminum-based sintered material or from between grain boundaries in the material, resulting in gradually developing corrosion of the ceramic material. This is because aluminum halide formed from the material reacting with halogenous plasma has a low melting temperature.

In dry etching or cleaning processes, also, ceramic material members have another problem of generating, by corrosion, particles which cause open or short circuit of metal wiring parts or interconnections on a semiconductor device, thereby deteriorating the device characteristics.

These particles result from corroding the members, such as an inner wall, a clamp ring, etc., which constitute the inner portions of the halogenous plasma treating chamber, by halogenous-corrosive gases and their plasma. The particle compound is evaporated by corrosion reaction of an component in the material with halogen plasma, and is repeatedly accumulated onto the inner wall of the chamber made of a high corrosion-resistant material.

Therefore, for the purpose of preventing the evaporated halide from accumulating as a deposit onto the chamber inner wall, the halide is evaporated and discharged by heating the chamber outer wall using infrared lamps. Therefore, not only high heat resistance, but also high thermal conductivity is required to members used in the chamber.

The present inventors have found that rare-earth-containing compounds form halides with a high melting point and high corrosion resistance even if the halide is produced as a result of reaction with the halogenous-corrosive gas or plasma thereof, then, proposing the rare-earth-containing compounds as members for plasma processing systems which are used for production of semiconductors (see Japanese Patent Publications (A)10-45467 and (A)10-236871).

However, since the rare-earth-containing compounds such as yttria $Y_2O_3$ and yttrium-aluminum-garnet (YAG), which are considered to be suited for practical use, have low thermal conductivity of 10 W/mK or less, heat quantity added is not distributed uniformly all over the wall even when heating outside the chamber wall for the purpose of preventing the halide deposition from accumulating onto the chamber inner wall, thus obtaining only a local effect of preventing halide deposition.

A proposal has been made to improve the corrosion resistance and heating uniformity by forming a thin film made of a rare-earth-containing compound on the surface of a substrate having high thermal conductivity such as conventional AlN substrate; however, there arose a problem that the thin film is peeled off on heating the substrate due to a difference in thermal expansivity between the substrate and thin film.

Also, the outer wall of the chamber is often heated rapidly to high temperatures using lamps for preventing halide accumulation onto the chamber inner wall, and therefore thermal-shock resistance, together with the corrosion resistance and thermal conductivity, is required to ceramic members used as such parts inside the chamber.

SUMMARY OF THE INVENTION

An object of the present invention is to provide a ceramic member having high corrosion resistance to halogenous gas and plasma thereof.

Another object of the present invention is to provide a ceramic member having thermal conductivity enough to prevent accumulation of a deposit over the whole member by external heating.

Still another object of the present invention is to improve the thermal-shock resistance of the ceramic member in the use under high temperature in halogen plasma.

A ceramic member in the present invention is provided to contain not less than 10% by volume of a phase of an oxide compound of a rare earth metal and aluminum, in other words, a double oxide of rare earth metal oxide and aluminum oxide, and at least one oxide phase selected from aluminum oxide, yttrium oxide and aluminum nitride as the main balance.

In the ceramic member of the invention, the oxide compound of rare earth metal and aluminum is preferably yttrium-aluminum-garnet (hereinafter referred to as YAG). The oxide compound may have another structure of millet or perobskite composed of yttrium and aluminum.

A ceramic member of the present invention contains a phase of YAG of not less than 10% by volume and a phase of yttrium oxide as the main balance, wherein the amount of yttrium in ceramic member is within a range of 35 to 80 mole % in terms of yttrium oxide and the amount of aluminum is within a range of 20 to 65 mole % in terms of aluminum oxide in the ceramic member, thereby, improving corrosion resistance of the ceramic member with respect to halogen plasma, and also increasing sintering performance significantly to obtain dense sintered material.

The ceramic member of the present invention may includes, as a main crystalline phase, a single YAG single phase, or a mixed phase of the YAG phase and an alumina phase, or a mixed phase of the YAG phase and an yttria phase, and contains zirconium oxide or cerium oxide. The addition of zirconia or ceria into the ceramic material containing the YAG phase improves the thermal-shock resistance without impairing the corrosion resistance. In the present invention, a thermal-shock resistance requires not less than 100° C. as thermal-shock resistance temperature ΔT defined hereinafter.

Zirconium oxide is present as a phase between the grain boundaries of the main crystalline, which phase preferably contains cerium oxide as a stabilizer, whereby zirconia to be added is stabilized to form a tetragonal crystalline structure by cerium.

In the present invention, cerium oxide may be independently added to a single phase of YAG to improve the relative density of the YAG sintered material to 99% or more, and the resulting YAG sintered material can exhibits high corrosion resistance even when exposed to halogen plasma.

In a ceramic member of the present invention, the volume of a compound of rare earth metal oxide and aluminum oxide is preferably within a range of 10 to 60% and the balance may be aluminum oxide or aluminum nitride. This ceramic member employs a structure of the ceramic body where the compound phase of rare earth metal oxide and aluminum oxide, especially, YAG phase, is dispersed in the form of grains in a matrix of aluminum oxide or aluminum nitride within the above range, thereby, realizing a ceramic member which exhibits high corrosion resistance to halogen plasma and has high thermal conductivity of not less than 20 W/mK due to aluminum oxide or aluminum nitride matrix, so as effectively to prevent accumulating the particle deposit by heating.

BEST MODE FOR CARRYING OUT THE INVENTION

Figure 1:
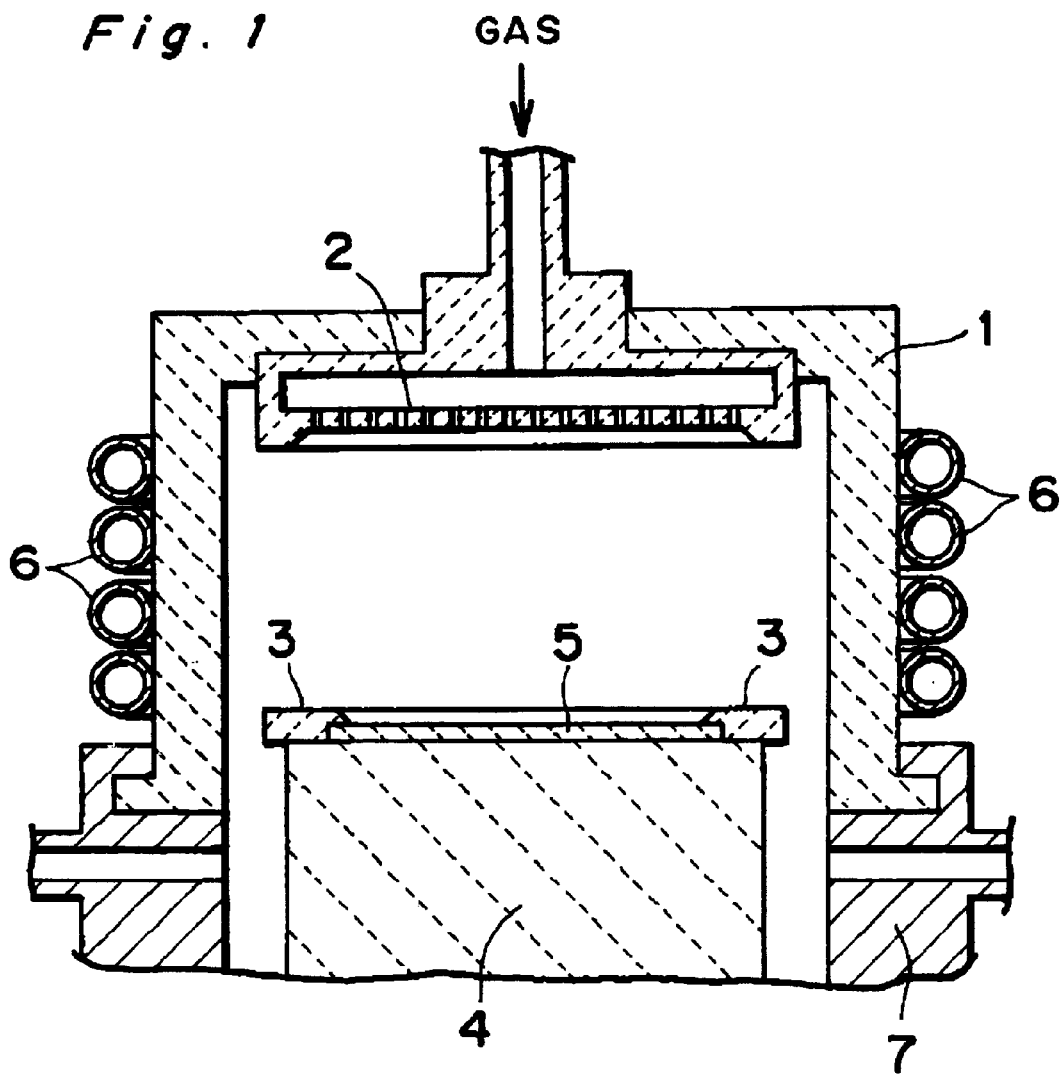
FIG. 1 is a schematic cross sectional view showing an inner structure of a chamber made of a corrosion-resistant ceramic member, the chamber being used in an etching or cleaning system of a semiconductor device.

In the RIE system and the ECR system utilizing microwave, as well as an etching or cleaning system, as shown in FIG. 1, halogenous gases converted into plasma are utilized. In the present specification, halogenous gases include fluoric gas such as $SF_6$, $CF_4$, $CHF_3$, $ClF_3$, $NF_3$, $C_4F_8$ and HF; chlorinous gas such as $Cl_2$, HCl and $BCl_3$; and bromic gas such as $Br_2$, HBr and $BBr_3$. These gases are utilized for etching or cleaning substrates or wafers after converting into plasma.

Also, to remove organic matters such as resist used for processing wafers, ashing of combusting organic matters on the wafer surface by introducing a $O_2$ gas is conducted.

When microwave or radio frequency is introduced under an atmosphere where these halogenous-corrosive or oxygen gasses are used, these gases are converted into plasma. To further enhance the etching effect, plasma is generated sometimes by introducing inert gases such as Ar, together with the halogenous-corrosive gases. Utilization of ion bombardment to etching is particularly increased by utilization of high-density plasma.

The ceramic member of the present invention further comprises any other members to be exposed to plasma or ion bombardment, such as focus ring, shield ring and deposition-preventing plate, in addition to the above chamber parts. A system for generating plasma by microwave comprises parts such as microwave-introducing window.

According to the present invention, a ceramic member to be exposed to these halogenous-corrosive gases or plasma thereof is made of ceramics containing a double oxide of rare earth metals and aluminum, thereby enhancing the corrosion resistance to halogen gas converted into plasma.

As the double oxide of rare earth metals and aluminum, for example, a phase of double oxide of yttrium oxide and aluminum oxide is utilized. The double oxide includes garnet ($Y_3Al_5O_{12}$), nonoclinic ($Y_2AlO_9$) or perobskite structures.

This phase of double oxide is contained in the amount of not less than 10% by volume, and one member selected from aluminum oxide, yttrium oxide and aluminum nitride is contained as the balance. Particularly, yttrium-aluminum-garnet (hereinafter referred to as YAG) is preferably utilized and, in this case, a YAG phase is preferably contained in ceramics in the amount of not less than 10% by volume.

YAG constituting a crystalline phase of a ceramic sintered material reacts with a fluorine gas to form $YF_3$ exclusively, or reacts with a chlorine gas to form $YCl_3$ exclusively. Since the melting point of these halides ($YF_3$ has a melting point of 1152° C., and YC13 has a melting point of 680° C.) is higher than that of halides produced by a conventional reaction with quartz glass, an alumina sintered material or an aluminum nitride sintered material ($SiF_4$ has a melting point of −90° C., $SiCl_4$ has a melting point of −70° C., $AlF_3$ has a melting point of 1040° C., and $AlCl_3$ has a melting point of 178° C.), a stable halide is formed on the surface when exposed to halogenous-corrosive gases or plasma, thereby to prevent further proceeding of the corrosion, thus exerting the corrosion resistance.

For this reason, the corrosion resistance of the ceramic member of the present invention to halogen converted into plasma can be further improved by increasing the content of yttrium oxide. As described above, an increase in ratio of the component capable of increasing the melting point of the halide formed by the reaction with the halogenous-corrosive gases or plasma, thereby making it possible to improve the corrosion resistance. However, since the capability of sintering is very small when using yttria alone, it is impossible to obtain a dense sintered material having high porosity. Therefore, the corrosion resistance to halogen plasma of ceramics of yttria is lower than that expected.

Embodiment 1

In a first embodiment, a ceramic member is formed of a mixed structure of a YAG phase and an yttria phase. In the ceramic member, this structure increases the melting point of a halide formed by reacting the YAG and yttria phases with halogen plasma, and, at the same time, can improve the capability of sintering so as to densify a sintered material to the porosity of not more than 2%, then, both improving corrosion resistance of the sintered material.

In this embodiment, the sintered material is preferably a composition comprising 35–80 mole % of yttrium oxide and 20–65 mole % of aluminum oxide. The chemical composition of YAG satisfy the following expressions:

$0.365 \leq X_y \leq 0.385$; and $0.615 \leq X_A \leq 0.635$;

where $X_y$ is a mole fraction of yttria in the sintered material and $X_A$ a mole fraction of alumina in the same.

If yttria content is less than 35 mole %, a yttria phase is absent in the ceramic sintered material and the amount of alumina phase increases, and therefore, the ceramic sintered material is liable to be corroded by halogenous-corrosive gases or plasma thereof. On the other hand, it the content of yttrium oxide exceeds 80 mole %, the amount of the yttria phase increases thereby to drastically deteriorate the capability of sintering. Therefore, a dense sintered material having a comparative density of not less than 99% can not be obtained by sintering under normal pressure. Such a sintered material must be densified by using HIP (Hot Isostatic Pressing), whereby the cost is increased.

To enhance the corrosion resistance of the ceramic sintered material constituting the ceramic member, the total content of both YAG and yttria crystalline phases as a main component is preferably not less than 99% by weight, preferably not less than 99.5% by weight, and the porosity is not more than 0.2%, particularly not more than 0.1%. When the total content of both crystalline phases is less than 99% by weight, a grain boundary phase formed of impurities is liable to be corroded. Removal of the grain boundary phase due to corrosion depends on the degree of proceeding or the corrosion, and separates main crystalline granules on the surface of the sintered material, thereby to generate particles floated in a processing atmosphere and to accelerate erosion of the material itself. Such a component of impurities contains $SiO_2$, $CaO$, $Na_2O$ and $Fe_2O_3$ and the corrosion is caused by the fact that the melting point of the halide produced by the reaction between these impurities and halogenous-corrosive gases is not so high. Thus, the amount of these impurities is preferably controlled to 1% by weight or less based on 100% by weight as the total weight of the sintered material composed of yttria and YAG as a main component. The amount of these impurities is controlled to 1% by weight or less by using high-purity alumina and yttria as a starting material and preventing inclusion of impurities in the production process.

The reason why the porosity of the ceramic sintered material is controlled to 0.2% or less is as follows. That is, when pores are present, edges of pores are liable to be corroded and, when the porosity exceeds 0.2%, proceeding of the corrosion is accelerated.

The crystalline phase of the ceramic sintered material can be decided by the X-ray diffraction technique. The contents of crystalline phase in the ceramic sintered material are decided by ICP emission spectrochemical analysis or fluorescent X-ray analysis. The porosity can be determined by the Archimedean method.

EXAMPLE 1

A ceramic sintered material comprising crystalline phases of yttria and YAG as a corrosion-resistant member of the present invention as well as quartz glass, an alumina sintered material having a purity of 99.5% by weight and an alumina sintered material having a purity of 99.9% by weight as a conventional corrosion-resistant member were prepared respectively, and then the corrosion resistance when exposed to plasma under fluorine and chlorine-corrosive gases was examined.

In these tests, each of corrosion-resistant members of the present invention and conventional corrosion-resistant members was formed into pieces having a diameter of 30 mm and a thickness of 3 mm and then lapped to obtain samples with a mirror surface. Each of these samples was mounted Lo a RIE (Reactive Ion Etching) system and, after exposing to plasma in a $SF_6$ gas atmosphere and a $Cl_2$ gas atmosphere for 3 hours, an etching rate per 1 minute was calculated from a weight loss before and after processing. A numerical value of the etching rate is shown by a relative comparison, assuring that the etching rate of the alumina sintered material having a purity of 99.9% by weight is a unit.

The corrosion-resistant member of the present invention was made of a material having a purity of 99.5% by weight, which contains each of various crystalline phases. The characteristics and results of the respective samples are as shown in Table 1. As a result, Nos. 2 to 6 as the corrosion resistance member of the present invention had excellent corrosion resistance to any corrosive gases such as $Cl_2$ gas and $SF_6$ gas as compared with conventional corrosion-resistant members. It has been found that, as the content of yttria in the present invention becomes higher than 35 mole %, the resulting member tends to exhibit better corrosion resistance. However, as shown in Nos. 1 and 2, the etching rate begins to decrease until the content reaches 80 mole % as the upper limit.

This is because pores increase by lowering of the capability of sintering and bonding of granules is also lowered.

TABLE 1

| | Composition of ceramic sintered material (mole %) | | Crystalline phase as main component of ceramic | Specific etching rate | |
|---|---|---|---|---|---|
| | $Al_2O_3$ | $Y_2O_3$ | sintered material | $Cl_2$ | $SF_6$ |
| 1 | 0 | 100 | $Y_2O_3$ | 0.41 | 1.43 |
| 2 | 20 | 80 | $Y_2O_3$, YAG | 0.18 | 0.04 |
| 3 | 34 | 66 | $Y_2O_3$, YAG | 0.19 | 0.06 |
| 4 | 40 | 60 | $Y_2O_3$, YAG | 0.21 | 0.04 |
| 5 | 50 | 50 | $Y_2O_3$, YAG | 0.24 | 0.06 |
| 6 | 55 | 45 | $Y_2O_3$, YAG | 0.26 | 0.06 |
| 7 | 65 | 35 | YAG | 0.30 | 0.09 |
| 8 | 80 | 20 | $Al_2O_3$, YAG | 0.51 | 0.24 |
| 9 | Alumina (99.5%) | | $Al_2O_3$ | 1.25 | 0.52 |
| 10 | Alumina (99.5%) | | $Al_2O_3$ | 1.00 | 1.00 |
| 11 | Quartz glass | | $SiO_2$ | 4.6 | 18.26 |

EXAMPLE 2

An influence of the purity (content of main crystalline phases) for the corrosion-resistant member was tested under the same conditions as in Example 1. In the tests, ceramic sintered materials composed of crystalline phases of yttria and YAG, which have the purity described in Table 2, were produced, respectively, using those having a composition wherein a molar ratio of alumina to yttria is 55:45.

The characteristics and results of the respective samples are as shown in Table 2. A numerical value of the etching rate is shown by a relative comparison when the etching rate of the sintered material having a purity of 90% by weight is 1.

As a result, the samples had excellent corrosion resistance to any corrosive gases such as $Cl_2$ gas and $SF_6$ gas by controlling the purity to 99% by weight or more. It is seen from the etching rate change to $SF_6$, that the etching rate can be decreased noticeably by controlling the purity to 99% or more by weight.

TABLE 2

| | Purity of yttria + YAG (% by weight) | Specific etching rate $Cl_2$ | $SF_6$ |
|---|---|---|---|
| 1 | 99.99 | 0.44 | 0.11 |
| 2 | 99.9 | 0.48 | 0.11 |
| 3 | 99.5 | 0.59 | 0.11 |
| 4 | 99.0 | 0.68 | 0.28 |
| 5 | 95.0 | 0.89 | 0.61 |
| 6 | 90.0 | 1.00 | 1.00 |

EXAMPLE 3

Using the ceramic sintered material in sample No. 3 listed in Table 2, the corrosion resistance when the porosity is changed by controlling the firing temperature was determined under the same conditions as in Example 1.

The characteristics and results of the respective samples are as shown in Table 3. A numerical value of the etching rate is shown by comparison when the etching rate of the sintered material having a purity of 90% by weight is 1.

As a result, by controlling the porosity to 0.2% or less, the samples had excellent corrosion resistance to any corrosive gases such as $Cl_2$ gas and $SF_6$ gas. As is apparent from the etching rate to $SF_6$, the etching rate can be decreased noticeably by controlling the porosity to 0.2% or less.

TABLE 3

| | Porosity (%) | etching rate (relative) $Cl_2$ | $SF_6$ |
|---|---|---|---|
| 1 | 0.0 | 0.42 | 0.01 |
| 2 | 0.1 | 0.46 | 0.03 |
| 3 | 0.2 | 0.51 | 0.03 |
| 4 | 0.5 | 0.74 | 0.49 |
| 5 | 1 | 1.00 | 1.00 |

As described above in detail, the corrosion resistance to plasma can be particularly improved by forming the corrosion-resistant ceramic member of the present invention, which is to be exposed to halogenous-corrosive gasses or their plasma, using a sintered material containing both crystalline phases of yttria and YAG, controlling the purity to 99% by weight or more, and controlling the porosity to 0.2% or less.

Embodiment 2

In the second embodiment of the present invention, a sintered material of a single YAG phase is used exclusively as a ceramic member and a trial of further densifying a YAG sintered material is made by adding cerium oxide as a sintering agent to the sintered material. YAG sintered material has general characteristics which are summarized in Table 4, and has particularly high deflective strength, rigidity and insulating properties.

TABLE 4

| Items | Data | Measuring method and conditions |
|---|---|---|
| Bulk density | 4.55 g/cm$^3$ | |
| Deflective strength | 250 MPa | Four-point bending strength |
| Vickers hardness | 12 GPa | |
| Young's modulus | 280 GPa | Ultrasonic pulse method |
| Thermal expansion coefficient | 7.8 K$^{-1}$ | Room temperature to 400° C. |
| Inherent volume resistivity | >1 × 10$^{14}$ Ω · cm | Room temperature |
| | >1 × 10$^{14}$ Ω · cm | at 300° C. |
| | 2 × 10$^{12}$ Ω · cm | at 500° C. |
| Dielectric constant | 11 | at 1 MHz |
| Dielectric loss | 3 × 10$^{-4}$ | at 1 MHz |

However, a sufficiently high densified material must be produced by sintering to exhibit above mechanical characteristics of YAG. In this embodiment of the present invention, an attempt of densifying the sintered material is made by adding a small amount of cerium oxide to a single YAG sintered material.

Cerium oxide is preferably added within a range of 3 ppm to 10000 ppm by weight into YAG material, to enhances a relative density of the YAG sintered material to 99% or more, and, at the same time, reduces voids exposed to the surface, thereby improving the corrosion resistance to halogen plasma of the ceramic members.

When the content of cerium oxide is less than 3 ppm by weight, an effect of densifying YAG sintered material is not exhibited and, therefore, the relative density can not be enhanced to 99% or more. On the other hand, when the content of cerium oxide is larger than 1.0% by weight, cerium oxide reacts with aluminum oxide which is left in ceramics as the unreacted component, during sintering, to form cerium aluminate in the forms of particles. The cerium aluminate particles can fall off the material surface during halogen plasma processing, resulting in a source for generating pores opening on the surface which accelerate the corrosion in the plasma.

It is preferable to control the mean grain size of the YAG crystal to 10 μm or less so as to obtain the relative density to 99% or more of the YAG sintered material. When the mean grain size of the YAG crystal exceeds 10 μm, gaps are formed between the YAG crystal grains on sintering, thereby increasing the amount of pores and, therefore, the relative density can not be controlled to 99% or more. In this case, the occupied by voids that are exposed with respect to the surface of the YAG sintered material can not be controlled to 0.3% or less and, therefore, corrosive wear due to halogenous gases or its plasma is accelerated.

As the mean grain size of the YAG crystal may be smaller than 2 μm, the amount of the grain boundary phase in the YAG sintered material tends to be increased, and therefore, the corrosion resistance is lowered by the unreacted, residual component of aluminum oxide and impurities such as silicon oxide and cerium aluminate, which are present in the grain boundary phase.

The mean grain size of the YAG crystal is preferably controlled within a range of 2 to 10 μm.

In the YAG ceramics, a mole fraction $X_y$ of yttrium oxide and a mole fraction $X_A$ of aluminum oxide must be within the above limited range so as to produce the YAG crystal. However, it is difficult to control the mole fractions of yttrium oxide and aluminum oxide within the above range. The content of yttrium larger than the above range produces an yttria phase in the ceramics of YAG. On the other hand, excess of aluminum beyond the above range can produce an aluminum oxide phase in the YAG ceramics.

A small amount of the alumina phase produced in the grain boundary deteriorates the corrosion resistance. As described above, even the component of impurities such as silicon oxide, cerium aluminate present in the grain boundary phase reduces the corrosion resistance.

Preferably, these unreacted components and impurities are reduced in a level as smaller as possible. To this end, an intensity peak ratio $I_A/I_Y$ in X-ray diffraction may be not more than 0.005, where $I_Y$ is a main diffraction peak intensity of YAG and $I_A$ is a main diffraction peak intensity of the major components other than YAG.

In the YAG sintered material, the crystalline phase constituting the ceramic member of the present invention can be determined by X-ray diffraction. The content of the components can be determined by ICP mass spectrometric analysis. The mean grain size can be determined by the code method.

The occupied area ratio of pores which are present on the surface of the YAG sintered material means a proportion of the area occupied by pores with respect to unit area of the surface of the YAG sintered material. In measuring the occupied area rates of pores to the surface, micrographs of the sampling areas in the surface of the YAG sintered material are taken by using scanning electron microscopy (magnification: ×1000), to determine the ratio of the sum area of pores existing in the micrographic viewing area, to said viewing.

A method of producing the ceramic member in this second embodiment will be described below.

First, aluminum hydroxide powders and an yttrium compound solution are mixed in a predetermined proportion to form a precipitate, which is then fired at a temperature of 700 to 1500° C. to combine YAG powders. To produce YAG material, yttrium oxide and aluminum oxide are mixed to prepare the composition of both oxides within the above proper range represented by mole fractions.

Then, the resulting YAG powder and a dispersant is charged with deionized water in a mixing mill, mixed uniformly using high-purity alumina balls or zirconia balls, and then ground until the mean grain size is attained to 0.5–2 μm to prepare a slip.

The resulting slip is formed by molding or tape forming process using a doctor blade. Alternatively, the slip is sprayed and granulated using a spray-dryer to produce powders. The resulting granulated may be filled into dies to shape desired compacts by die press. The Powder maybe rubber pressed, injection molded or near-net formed to compacts, and later may be machined to give predetermined shapes.

The resulting formed compacts may be fired in an air environment at 1600 to 1800° C. The firing temperatures lower than 1600° C. will result in insufficient capability of sintering the compacts. On the other hand, the firing at temperatures exceeds 1800° C. introduces abnormal grain growth of the YAG crystals, allowing the amount of pores in the YAG sintered material to increase. This, thereby, makes it impossible to control the occupied area of pores, which are present on the surface of the YAG sintered material, to 0.3% or less. Accordingly, the firing may be conducted at a temperature within a range of 1600 to 1800° C.

To densify the YAG sintered material constituting the corrosion/plasma-resistant ceramic member, the resulting formed material may also be subjected to hot isostatic press (HIP) in an inert gas atmosphere under pressure within a range of 1000 to 2000 atm.

EXAMPLE 4

Corrosion/plasma-resistant ceramic members made of YAG sintered materials having different contents of cerium oxide were prepared and a test of examining the degree of corrosive wear on exposure to plasma under a fluorine or chlorine halogen gas was conducted.

In this test, each of corrosion/plasma-resistant ceramic members was formed into plates having a size of 20 mm×20 mm×3 mm in thickness and then lapped to obtain samples with a mirror surface. Each of these samples was mounted to a Reactive Ion Etching (RIE) system and, after exposing to plasma under fluoric gas (a mixture of $CF_4$ gas: 20 sccm, $CHF_3$ gas: 40 sccm and Ar gas: 60 sccm) and chlorine gas ($Cl_2$ gas: 100 sccm) for 3 hours, an etching rate per 1 minute was calculated from a weight loss before and after processing. A numerical value of the etching rate was represented as a relative value assuming that the etching rate of a conventional YAG sintered material containing no cerium oxide is unit.

The characteristics and results of the respective samples are as shown in Table 5.

TABLE 5

| No. | Content of ceria (ppm) | Relative density (%) | Mean grain size (μm) | Etching rate (relative) $Cl_2$ gas | Etching rate (relative) Fluoric gas |
|---|---|---|---|---|---|
| 1 | 0.7 | 97.4 | 1.6 | 1.00 | 1.00 |
| 2 | 1.7 | 97.8 | 1.8 | 0.96 | 1.02 |
| 3 | 3.1 | 99.2 | 2.2 | 0.77 | 0.78 |
| 4 | 3.7 | 99.8 | 2.3 | 0.75 | 0.71 |
| 5 | 6.0 | 99.8 | 2.3 | 0.78 | 0.74 |
| 6 | 100 | 99.8 | 2.4 | 0.77 | 0.74 |
| 7 | 1000 | 99.8 | 2.3 | 0.78 | 0.75 |
| 8 | 10000 | 99.8 | 2.3 | 0.78 | 0.77 |
| 9 | 15000 | 99.8 | 3.2 | 1.02 | 0.98 |
| 10 | 6.0 | 99.6 | 5.0 | 0.11 | 0.59 |
| 11 | 6.0 | 99.3 | 6.0 | 0.19 | 0.70 |
| 12 | 6.0 | 99.1 | 9.5 | 0.23 | 0.73 |
| 13 | 6.0 | 98.2 | 11.5 | 0.47 | 0.80 |
| Alumina | — | — | — | 1.75 | 2.38 |

As apparent from the results, the samples Nos. 3 to 8 wherein the addition of cerium oxide within a range of 3 to 10000 ppm by weight can improve the relative density of the YAG sintered material to 99% or more and the resulting YAG sintered material has better corrosion/plasma resistance than that of a conventional YAG sintered material even when exposed to plasma under any halogenous gas.

EXAMPLE 5

Samples wherein the content of cerium oxide is 6 ppm and an intensity peak ratio ($I_A/I_Y$) of a main intensity peak ($I_Y$) of YAG to a main intensity peak ($I_A$) of the components other than YAG is changed were prepared and the same Lest as in Example 1 was conducted. The characteristics and results of the respective samples are as shown in Table 6.

TABLE 6

| No. | Content of ceria (ppm) | Relative density (%) | Mean grain size (μm) | Occupied surface ratio of voids (%) | Main peak ratio $I_A/I_Y$ | Etching rate Cl$_2$ gas | Etching rate Fluorine gas |
|---|---|---|---|---|---|---|---|
| 1 | 6.0 | 95.8 | 1.2 | 1.20 | 0.007 | 0.56 | 0.46 |
| 2 | 6.0 | 99.3 | 1.6 | 0.12 | 0.006 | 0.53 | 0.41 |
| 3 | 6.0 | 99.8 | 2.3 | 0.02 | 0.005 | 0.46 | 0.31 |
| 4 | 6.0 | 99.6 | 5.0 | 0.11 | 0.003 | 0.35 | 0.25 |
| 5 | 6.0 | 99.3 | 6.0 | 0.19 | 0 | 0.45 | 0.34 |
| 6 | 6.0 | 99.1 | 9.5 | 0.28 | 0.001 | 0.45 | 0.31 |
| 7 | 6.0 | 98.2 | 11.5 | 0.38 | 0.002 | 0.58 | 0.45 |
| 8 | | | Alumina | | | 1.00 | 1.00 |

As is apparent from the results, the resulting YAG sintered material has better corrosion/plasma resistance than that a conventional YAG sintered material even when exposed to plasma under any halogenous gas by controlling the intensity peak ratio ($I_A/I_Y$) to 0.005 or less. As described above, according to the corrosion/plasma-resistant ceramic member of the present invention, there can be obtainedexcellent corrosion/plasma resistance wherein corrosive wear hardly occurs even when exposed to plasma under fluorine or chlorine halogenous gases by forming an yttrium-aluminum-garnet sintered material containing 3 to 10000 ppm of cerium oxide.

Therefore, when using the corrosion/plasma-resistant ceramic members of the present invention as a member to be exposed to halogenous gases or plasma of a film forming or etching system, the number of maintenance or exchange of the members can be markedly reduced, thereby enhancing the productivity of a film forming or etching process in which the processing system uses the members according to this third Embodiment Embodiment 3

In the third embodiment, zirconia is contained in the grain boundary of a ceramic material containing an yttrium-aluminum-garnet phase and/or an yttria phase or an alumina phase, thereby enhancing the thermal-shock resistance. Zirconium oxide is preferably contained in the amount of 0.05 to 5.0% by weight in the sintered material. Because a zirconia phase prevents propagation of cracking, occurred in ceramics on thermal shock, at the grain boundary between mixed phases of yttria and YAG.

Describing in detail, zirconia in the sintered material may present in the form of a tetragonal system, and this zirconia phase absorbs propagation energy of cracking by causing a phase transformation from a tetragonal zirconia into a monoclinic system due to thermal shock. To stabilize the zirconia phase in the form of the tetragonal system, cerium oxide is preferably used as a stabilizer. Although a stabilizer for stabilizing zirconia may be yttrium oxide or calcium oxide, but yttrium oxide as the stabilizer does not exert an stabilizing effect on zirconia because a large amount of yttria is used in the sintered material of the present invention. On the other hand, calcium oxide is low in corrosion resistance to halogen plasma. Cerium oxide stabilizes the tetragonal phase of zirconia most effectively.

It is preferably to control the amount of zirconia oxide to 5.0% by weight or less in the sintered material. When the amount is larger than the limit value, the ceramic member is liable to be corroded by halogenous-corrosive gases or plasma because zirconia itself has poor corrosion resistance. When cerium oxide is added to zirconia in the amount of not less than 1% by weight, zirconia between grain boundaries of the YAG can be partially stabilizing. The addition of ceria prevents thermal deterioration of the zirconia phase in the ceramic member heated to a temperature of 100 to 200° C. by using heating lamps.

A example of the method of producing a corrosion-resistant ceramic member according to the third embodiment of the present invention will be described below.

First, aluminum hydroxide powders and an yttrium compound solution are mixed in a predetermined ratio to form a precipitate, which is then temporarily fired at a temperature of 700 to 1500° C. to combine YAG powders. The resulting YAG powders and a dispersant are charged in the deionized water in a pot mill and mixed uniformly using high-purity alumina balls in the mill, and then ground until the mean grain size becomes 0.5–2 μm to prepare a slip or paste. The resulting slip is formed by molding or tape forming process with a doctor blade. Alternatively, the slip is dried and granulated using a spray-dryer to produce powders and a die is filled with the resulting granulated, and then the powders are formed by die press, rubber press, injection molding or near net forming process. At this time, the resulting formed material may also be machined to give a predetermined shape.

In such way, lowering of the capability of sintering due to an increase in amount of yttria is covered by refining and homogenization of the starting materials, thereby making it possible to sinter under pressure at a firing temperature of 1600 to 1850° C. The reason why the firing temperature is within a range of 1600 to 1850° C. is as follows. That is, when the firing temperature is lower than 1600° C., the degree of sintering is insufficient. On the other hand, if the firing temperature is higher than 1850° C., grain growth occurs. In any case, the porosity of the sintered material can not be densified to 0.2% or less. Thereby a corrosion-resistant member containing yttria and YAG as a main crystalline phase can be obtained.

To further densify the member, the porosity may be controlled to nearly 0% by subjecting the ceramic sintered material to hot isostatic pressing (HIP) in an inert gas atmosphere at a pressure of 1000 to 2000 atm.

EXAMPLE 6

A ceramic sintered material comprising a mixed phase of YAG containing 5000 rpm of zirconia and 50 ppm by weight of ceria and yttria and a mixed phase of YAG and alumina and a ceramic sintered material comprising YAG as a main crystalline phase wherein the amount of zirconia and ceria is changed, as a corrosion-resistant member of the present invention, and quartz glass, an alumina sintered material having a purity of 99.5% by weight, an alumina sintered material having a purity of 99.9% by weight and YAG containing no zirconia and ceria, as a conventional corrosion-resistant material, were prepared and the corrosion resistance on exposure to plasma under fluorine or chlorine corrosive gases was examined. In this test, each of corrosion-resistant members of the present invention and conventional corrosion-resistant members was formed into pieces having a diameter of 30 mm and a thickness of 3 mm and then lapped to obtain samples with a mirror surface. Each or these samples was mounted to a RIE system and, after exposing to plasma in a SF$_6$ gas atmosphere and a Cl$_2$ gas atmosphere for 3 hours, an etching rate per 1 minute was calculated from a weight loss before and after processing. A numerical value of the etching rate is shown by a relative comparison when the etching rate of the alumina sintered material having a purity of 99.9% by weight is 1.

The characteristics and results of the respective samples are shown in Table 7. Samples Nos. 2 to 8 had excellent corrosion resistance to any corrosive gasses such as $Cl_2$ gas and $SF_6$ gas as compared with conventional corrosion-resistant members. It has been found that, as the content of yttria becomes higher, the resulting member tends to exhibit better corrosion resistance. However, since the sample No. 1 containing only yttria is not dense and has a large porosity such as 5%, the corrosion resistance is deteriorated. The samples Nos. 9 to 12 had excellent corrosion resistance to any corrosive gases such as $Cl_2$ gas and $SF_6$ gas as compared with conventional corrosion-resistant members. When the amount of zirconia exceeds 50000 ppm, as is recognized in the sample No. 13, the corrosion resistance to the $SF_6$ gas is lowered to the same level as that of alumina as the same No. 15 that is not within the scope of the present invention.

TABLE 7

| | Composition of ceramic sintered material (mole %) | | Main crystalline phase of ceramic | Amount of secondary component (ppm) | | Etching rate (relative) | |
|---|---|---|---|---|---|---|---|
| No. | $Al_2O_3$ | $Y_2O_3$ | sintered material | $ZrO_2$ | $CeO_2$ | $Cl_2$ | $SF_6$ |
| 1 | 0 | 100 | $Y_2O_2$ | 5000 | 50 | 0.41 | 1.43 |
| 2 | 20 | 80 | $Y_2O_3$, YAG | 5000 | 50 | 0.18 | 0.04 |
| 3 | 34 | 66 | $Y_2O_3$, YAG | 5000 | 50 | 0.19 | 0.06 |
| 4 | 40 | 60 | $Y_2O_3$, YAG | 5000 | 50 | 0.21 | 0.04 |
| 5 | 50 | 50 | $Y_2O_3$, YAG | 5000 | 50 | 0.24 | 0.06 |
| 6 | 55 | 45 | $Y_2O_3$, YAG | 5000 | 50 | 0.26 | 0.06 |
| 7 | 65 | 35 | YAG | 5000 | 50 | 0.30 | 0.09 |
| 8 | 80 | 20 | $Al_2O_3$, YAG | 5000 | 50 | 0.51 | 0.24 |
| 9 | 65 | 35 | YAG | 100 | 5 | 0.31 | 0.10 |
| 10 | 65 | 35 | YAG | 500 | 5 | 0.31 | 0.11 |
| 11 | 65 | 35 | YAG | 10000 | 100 | 0.35 | 0.13 |
| 12 | 65 | 35 | YAG | 50000 | 500 | 0.45 | 0.18 |
| 13 | 65 | 35 | YAG | 70000 | 700 | 0.67 | 0.45 |
| 14 | 65 | 35 | YAG | 0 | 0 | 0.30 | 0.09 |
| 15 | Alumina (99.5%) | | $Al_2O_3$ | | | 1.25 | 0.52 |
| 16 | Alumina (99.9%) | | $Al_2O_3$ | | | 1.00 | 1.00 |
| 17 | Quartz glass | | $SiO_2$ | | | 4.60 | 18.26 |

EXAMPLE 7

The thermal-shock resistance of the corrosion-resistant member of the present invention was examined. In this test, samples (in size of 3×4×40 mm) for deflection test were made by using sintered materials Nos. 9 to 14 listed in Table 7 and, after heating to a predetermined temperature, the specimens were put in water and the thermal-shock resistance was evaluated by the presence or absence of cracking occurred on the surface of the sintered material. The presence or absence of cracking was judged by using a detecting solution and a difference in maximum temperature at which cracking does not occur was taken as a thermal-shock resistance temperature ΔT.

The test results of the respective samples are as shown in Table 8. That is, the thermal-shock resistance of the samples Nos. 10 to 12 of the present invention was improved as compared with the sample No. 14 wherein zirconia and ceria are not added. The effect requires the addition of not less than 500 ppm of zirconia and not less than 5 ppm of ceria, as recognized in the samples Nos. 9 and 10. As the amount increases, the thermal-shock resistance is further improved. The thermal-shock resistance of the sample No. 13 is improved by an increase in microcracks due to an increase in amount, however, the corrosion resistance is drastically deteriorated, to the contrary, as shown in Table 7. Therefore, the amount of zirconia is preferably not more than 50000 ppm and that of ceria is preferably not more than 500 ppm.

Now the test was conducted by using YAG as the main crystalline phase, and the results having the same mechanism are obtained with respect to a ceramic sintered material composed of any mixed phase of the other YAG and yttria or alumina.

TABLE 8

| | Composition of ceramic sintered material (mole %) | | Main crystalline phase of ceramic | Amount of secondary component (ppm) | | Thermal-shock resistance temperature |
|---|---|---|---|---|---|---|
| No. | $Al_2O_3$ | $Y_2O_3$ | sintered material | $ZrO_2$ | $CeO_2$ | ΔT (° C.) |
| 9 | 65 | 35 | YAG | 100 | 5 | 80 |
| 10 | 65 | 35 | YAG | 500 | 5 | 100 |
| 11 | 65 | 35 | YAG | 5000 | 50 | 130 |
| 12 | 65 | 35 | YAG | 50000 | 500 | 200 |
| 13 | 65 | 35 | YAG | 70000 | 700 | 220 |
| 14 | 65 | 35 | YAG | 0 | 0 | 80 |

EXAMPLE 8

Using a ceramic sintered material in the sample No. 7 described in Table 7, the corrosion resistance was examined by controlling the firing temperature to change the porosity under the same conditions as in Example 6. A numerical value of the etching rate is shown by a relative comparison, assuming the etching rate of the alumina sintered material having a purity of 99.9% by weight is unit.

The characteristics and results of the respective samples are as shown in Table 9. That is, corrosion-resistant member having a grain size of not more than 10 μm and a porosity of not more than 0.2% as the sintered material of the present invention had excellent corrosion resistance to any corrosive gases such as $Cl_2$ gas and $SF_6$ gas as compared with a conventional corrosion-resistant members.

Now the test was conducted by using YAG as the main crystalline phase, and the results having the same mechanism (corrosion proceeds from the edge of voids) are obtained with respect to a ceramic sintered material composed of any mixed phase of the other YAG and yttria or alumina.

TABLE 9

| | Porosity of | Grain size | Etching rate | |
|---|---|---|---|---|
| No. | YAG (%) | (μm) | $Cl_2$ | $SF_6$ |
| 1 | 0.0 | 6.0 | 0.30 | 0.09 |
| 2 | 0.1 | 7.5 | 0.36 | 0.09 |
| 3 | 0.2 | 9.8 | 0.41 | 0.10 |
| 4 | 0.5 | 11.2 | 0.74 | 0.49 |
| 5 | 1 | 14.7 | 0.98 | 0.72 |
| 16 | Alumina (99.9%) | | 1.00 | 1.00 |

As described above, regarding the corrosion-resistant ceramic member of the present invention, the corrosion resistance is improved by composing a corrosion-resistant member, that is to be exposed to halogenous-corrosive gases or plasma, of a sintered material composed a compound of yttria and alumina, a main crystalline phase being composed of YAG (yttrium-aluminum-garnet) or YAG and alumina, or YAG and yttria. The thermal-shock resistance is improved by containing zirconia as a secondary component in an amount of 500 to 50000 ppm and, furthermore, the corrosion resistance to plasma is improved by controlling the grain size to 10 μm or less and controlling the porosity to 0.2% or less.

Embodiment 4

In a fourth embodiment of the present invention, a ceramic member is composed of 10–60% by volume of a crystalline rare-earth-containing compound phase and a matrix containing at least one member of aluminum oxide and aluminum nitride.

As the crystalline rare-earth-containing compound phase, for example, a rare earth element-aluminum double oxide phase and a crystalline phase of a rare earth element oxide and the above matrix component, thereby to obtain a ceramic sintered material wherein such a compound phase is dispersed in the above matrix. As the rare earth element, yttrium is particularly selected and a double oxide phase of a crystalline rare earth element and aluminum oxide is utilized.

In this embodiment, the ceramic matrix contains at least one of alumina and AlN as main component; whereby, the thermal conductivity of the ceramic matrix is controlled to 20 W/mK or more, and preferably 30 W/mK or more.

When aluminum oxide or aluminum nitride is generally used as the member, $AlF_3$ and $AlCl_3$ are produced on the surface by contact with halogen plasma. The melting point of $AlF_3$ is 1040° C., but $AlCl_3$ has a low melting point such as 178° C. and sublimation property. Therefore, formation and sublimation of the reaction product and deposition thereof onto the surface of the member are drastically found out in halogen plasma and, furthermore, it is very difficult to remove $AlF_3$ deposited onto the surface. The ceramic member maybe externally heated to prevent accumulation of such a deposit, but the reaction with the halogen gas and sublimation proceed, resulting in severe surface consumption of the member.

In this fourth embodiment, the rare earth oxide reacts with halogen plasma to form a stable compound phase having a high melting point as described above. Accordingly, when a predetermined amount or more of a double oxide of rare earth oxide is dispersed in the ceramic matrix, the ceramic matrix having high temperature conductivity is protected by such a stable compound.

In use, even when heating to high temperature in case where the reaction product accumulated on the surface of the ceramic member is evaporated by external heating, the compound, obtained by the reaction between the rare-earth-containing compound and halogen plasma, is not evaporated or deteriorated because the compound has a high melting point and is stable. Even if the corrosion proceeds, the corrosion does not proceeds due to peel off or elimination of the reacted surface thin film, because a double oxide phase containing a crystalline rare earth oxide is uniformly dispersed in the matrix.

By composing the rare-earth-containing compound of a group consisting of a rare earth element-aluminum double oxide and a crystalline compound of a rare earth element oxide and the above matrix component, there can be exerted the following effect. That is, the adhesion with the matrix is enhanced and the rare-earth-containing compound is uniformly dispersed in the ceramic sintered material, thereby to maintain or improve the thermal conductivity of the ceramic matrix.

As the rare-earth-containing compound phase, for example, an yttrium-aluminum double oxide (e.g. garnet type of $Y_3Al_5O_{12}$, nonoclinic type of $Y_4Al_2O_9$, perobskite type, etc.) and an yttrium-aluminum double oxinitride can be utilized. As the yttrium-aluminum double oxide, for example, YAG can be preferably utilized.

It has been generally conducted to form a grain boundary phase by adding, as a sintering agent, a rare-earth-containing compound such as yttria in the above matrix component. However, when the sintering agent is added in a conventional amount, only the rare-earth-containing compound is scattered in the grain boundary to the matrix phase that is reacted with plasma and evaporated, and a satisfactory effect is not exerted on an improvement in corrosion resistance.

This embodiment makes it possible to markedly improve the corrosion resistance with maintaining the high temperature conductivity of not less than 20 W/mK by utilizing YAG as a rare-earth-containing compound and controlling the content of a YAG phase in ceramics to 10 to 60% by volume, preferably 30 to 60% by volume, more preferably 25 to 55% by volume.

When the content of the YAG phase is smaller than 10% by volume, this compound is exclusively present as a grain boundary phase of the matrix. Therefore, a protective film is not formed in case of contact with corrosive gases or plasma and the effect of improving the corrosion resistance can not be expected. As the corrosion of the matrix proceeds, only a scattered or localized YAG phase is remained to form particles, sometimes.

The thermal conductivity of the YAG phase itself is about 10 W/mK. When the content of the YAG phase exceeds 60% by volume, the rare-earth-containing compound is continuous in the ceramic matrix and, therefore, the corrosion resistance is markedly improved. However, the whole thermal conductivity is lowered and does not reach 20 W/mK or more and, therefore, effective prevention of deposition due to heating can not be expected.

Regarding the content of the rare-earth-containing compound, including YAG, in case where both of an improvement in corrosion resistance and high thermal conductivity of not less than 20 W/mK are attained, the content of the rare-earth-containing compound preferably varies depending on the kind of ceramics and rare earth elements that constitute the matrix. In case of the rare earth element having a small ionic radius, for example, the content is preferably decreased, slightly. In case of the rare earth element having a large ionic radius, for example, the content is preferably increased, slightly.

For example, regarding the element having a small ionic radius, such as Y, Er, Yb or the like, the rare-earth-containing compound is liable to take a garnet structure having a comparatively high thermal conductivity. Therefore, when using alumina as the ceramic matrix, the content is preferably within a range of 25 to 55% by volume, and more preferably from 35 to 50% by volume. When using AlN, the content is preferably within a range of 30 to 60% by volume, and more preferably from 40 to 55% by volume.

When using La, Ce or Nd having a large ionic radius as the rare earth element, the rare-earth-containing compound is liable to take a perobskite structure having a comparatively low thermal conductivity. Therefore, when using alumina as the ceramic matrix, the content is preferably within a range of 25 to 50% by volume, and more preferably from 35 to 40% by volume. When using AlN, the content is preferably within a range of 30 to 55% by volume, and more preferably from 35 to 45% by volume.

It is necessary that the rare-earth-containing compound dispersed in ceramics is crystalline. The thermal conductivity in the substance depends mainly on the propagation of phonon. When the crystallizability is lowered, phonone is scattered at the defect portion and the thermal conductivity is lowered.

Also in the ceramic member of this embodiment, the porosity of ceramics is preferably controlled to 0.2% or less, particularly 0.1% or less, so as to enhance the corrosion resistance as described above. When pores are present, abnormal discharge occurs at the edge portion of pores and corrosive gases are retained in the pores exposed to the surface and, therefore, the ceramic member is liable to be corroded at the vicinity of the pores. On the other hand, when the porosity exceeds 0.2%, proceeding of the corrosion is liable to be accelerated.

The sintered material according to the present invention is applied to the member to be exposed to halogenous-corrosive gases, or plasma or ion sputter thereof. Due to excellent corrosion resistance and heating, heat is uniformly distributed over the whole member, thereby to exert an effect on prevention of accumulation of the reaction product.

This ceramic member can be produced, for example, by the following procedure.

Ceramic materials for forming a ceramic matrix are mixed with a predetermined amount of one or more rare earth element oxides. At this time, rare earth element oxides and alumina may be added and, for example, a double oxide of rare earth element oxides such as YAG, YAM and the like and alumina may also be added.

In case where the ceramic matrix is alumina, purified water or an organic solvent such as alcohol is used as a solvent. If necessary, paraffin wax and PVA are added as a binder. The mixed materials are granulated, formed and then optionally subjected to green machining and removal of binder. The formed material thus obtained is normally fired in an air, or a non-oxidizing atmosphere according to the property of rare earth elements added, at a temperature within a range of 1400 to 1800° C.

In the case of AlN, organic solvents such as alcohol, toluene and the like are used as the solvent. Similar to the case of alumina, a binder is optionally added and the mixed material is granulated, formed and then worked. In case where removal of the binder is required, the formed material is preferably processed in a vacuum or a nitrogen atmosphere. The formed material is fired in a nitrogen atmosphere at a temperature within a range of 1500 to 1900° C. When the formed material is fired at 1800° C. or more, firing is preferably conducted in an atmosphere under pressure so as to prevent decomposition of AlN.

The compact or formed material may be machined into a predetermined shape after firing under pressure. The ceramic member can also be formed by making assembly parts and bonding them using a conventional procedure. Furthermore, the ceramic member is subjected to hot isostatic press, thereby making it possible to reduce the porosity.

The ceramic member according to the present invention can be applied to a member constituting the inside of an etching system shown in FIG. 1. When using the ceramic member of the present invention to the portion to be exposed to halogenous gases or plasma thereof, such as inner wall of chamber 1 and clamp ring 2, the ceramic member exhibits excellent corrosion resistance and plasma resistance and can be used for a markedly long period of time, thereby making it possible to reduce maintenance and number of exchange of parts and to improve the productivity.

Furthermore, the ceramic member of the present invention can be preferably used in the portion to be used in the inside of a film forming system and the portion to be exposed to halogenous-gases or plasma in other technical fields.

EXAMPLE 9

Using an alumina material having a purity of 99.9%, $Y_2O_3$ having a purity of 99.9%, $Yb_2O_3$ and $CeO_2$ were added In a predetermined amount. In the case of AlN, using a material having a purity of 99.9% and an oxygen content of 0.2%, $Y_2O_3$ having a purity of 99.9%, $Yb_2O$ and $CeO_2$ were added in a predetermined amount in the same manner, and then $Al_2O_3$ (Purity: 99.9%) required to form a crystalline phase was added.

In the case of $SiO_2$, using an amorphous material having a purity of 99.99%, $Y_2O_3$, $Yb_2O$ and $CeO_2$ (and $Al_2O_3$ required to form a rare-earth-containing compound crystalline phase) were added in a predetermined amount in the same manner.

To these powdered materials, paraffin wax as a binder was added, followed by mixing in a ball mill using IPA as a solvent, drying, granulation and further pressing.

The formed material was degreased in a vacuum. Then, alumina was fired in an air (in nitrogen for $CeO_2$-added formed material) at 1500 to 1750° C., AlN was fired in nitrogen at 1700 to 1800° C. under pressure, and $SiO_2$ was fired in a reducing atmosphere at 1400 to 1500° C., thereby to produce ceramics having a porosity of not more than 1%.

The crystalline phase in ceramics was identified by the X-ray powder diffraction technique. The content of the rare-earth-containing compound crystalline phase was determined from a calibration curve which was previously made by subjecting a mixed system of a ceramic matrix and a rare-earth-containing compound crystal to X-ray diffraction analysis. The thermal conductivity was measured by laser flash method and the porosity was determined by the Archimedean method.

Regarding the etching rate, the etching rate on exposure to fluorine or chlorine plasma was evaluated. The evaluation procedure is as follows. That is, each of ceramics was formed into pieces having a diameter of 20 mm and a thickness of 1 mm and then mirror-finished to obtain samples. Using a RIE (Reactive Ion Etching) system, a plasma etching test was conducted in a fluoric gas ($CF_4$) or chlorine gas ($Cl_2$) atmosphere and then an etching rate per 1 minute was calculated from a weight loss before and after subjecting to the test.

The presence or absence of particles was examined in the following procedure. That is, each of ceramics was formed into a disc having a diameter of 8 inch and a thickness of 2 mm and one surface was mirror-finished. After subjecting to plasma etching process, the etched surface was contacted with a Si virgin wafer of 8 inch and the unevenness of the contacted surface of the Si wafer was detected by laser scattering, and then the number of particles having a size of not less than 0.3 $\mu$m was counted by using a particle counter.

The parameter in the etching test was as follows: gas flow of 100 sccm, etching pressure of 5 Pa, RF output of 1.0 W/cm$^2$ and etching time of 5 hours.

TABLE 10

| No. | Matrix phase | Thermal conductivity (W/mk) | Species of disperse phase | Content of disperse phase (% by volume) | Firing temperature (° C.) |
|---|---|---|---|---|---|
| 1 | Al$_2$O$_3$ | 33.0 | Y$_3$Al$_5$O$_{12}$ | 5 | 1750 |
| 2 | | | Y$_3$Al$_5$O$_{12}$ | 12 | 1700 |
| 3 | | | Y$_3$Al$_5$O$_{12}$ | 30 | 1800 |
| 4 | | | Y$_3$Al$_5$O$_{12}$ | 30 | 1575 |
| 5 | | | Y$_3$Al$_5$O$_{12}$ | 30 | 1550 |
| 6 | | | Y$_3$Al$_5$O$_{12}$ | 30 | 1500 |
| 7 | | | Y$_3$Al$_5$O$_{12}$ | 55 | 1600 |
| 8 | | | Y$_3$Al$_5$O$_{12}$ | 65 | 1600 |
| 9 | | | Y$_2$AlO$_9$ | 15 | 1650 |
| 10 | | | Y$_2$AlO$_9$ | 35 | 1600 |
| 11 | | | Y$_3$Al$_5$O$_{12}$ | 40 | 1650 |
| 12 | | | CeAlO$_3$ | 30 | 1600 |
| 13 | AlN | 90.0 | Y$_3$Al$_5$O$_{12}$ | 5 | 1850 |
| 14 | | | Y$_3$Al$_5$O$_{12}$ | 12 | 1800 |
| 15 | | | Y$_3$Al$_5$O$_{12}$ | 30 | 1750 |
| 16 | | | Y$_3$Al$_5$O$_{12}$ | 30 | 1725 |
| 17 | | | Y$_3$Al$_5$O$_{12}$ | 30 | 1700 |
| 18 | | | Y$_3$Al$_5$O$_{12}$ | 55 | 1700 |
| 19 | | | Y$_3$Al$_5$O$_{12}$ | 65 | 1700 |
| 20 | | | YAlON | 15 | 1750 |
| 21 | | | YAlON | 35 | 1750 |
| 22 | | | Y$_3$Al$_5$O$_{12}$ | 40 | 1700 |
| 23 | | | CeAlO$_3$ | 30 | 1800 |
| 24 | SiO$_2$ | 0.2 | Y$_2$O$_3$.2SiO$_2$ | 20 | 1450 |
| 25 | | | Y$_2$O$_3$.2SiO$_2$ | 60 | 1400 |
| 26 | | | Yb$_2$O$_3$.2SiO$_2$ | 20 | 1450 |
| 27 | | | CeAlO$_3$ | 30 | 1500 |

| No. | Thermal conductivity of ceramic (W/mK) | Porosity (%) | CF$_4$ plasma Etching (nm/min) | CF$_4$ plasma Particle (number/8 in.) | Cl$_2$ plasma Etching (nm/min) | Cl$_2$ plasma Particle (number/8 inch.) |
|---|---|---|---|---|---|---|
| 1 | 28.0 | 0.1 | 7.5 | 50 | 7.9 | 40 |
| 2 | 27.0 | 0.1 | 4.2 | 28 | 4.7 | 25 |
| 3 | 25.0 | 0.0 | 2.5 | 17 | 2.2 | 16 |
| 4 | 25.0 | 0.1 | 2.7 | 18 | 2.3 | 17 |
| 5 | 24.0 | 0.3 | 3.5 | 19 | 3.2 | 19 |
| 6 | 20.0 | 1.0 | 4.0 | 28 | 4.5 | 27 |
| 7 | 20.0 | 0.1 | 2.2 | 18 | 2.2 | 15 |
| 8 | 15.0 | 0.1 | 2.1 | 42 | 1.8 | 40 |
| 9 | 28.0 | 0.1 | 4.5 | 26 | 4.1 | 24 |
| 10 | 25.0 | 0.1 | 2.9 | 23 | 2.9 | 20 |
| 11 | 25.0 | 0.1 | 2.7 | 22 | 2.1 | 16 |
| 12 | 21.0 | 0.1 | 2.7 | 24 | 2.4 | 19 |
| 13 | 65.0 | 0.1 | 7.1 | 85 | 7.5 | 77 |
| 14 | 60.0 | 0.1 | 4.8 | 29 | 4.4 | 26 |
| 15 | 52.0 | 0.1 | 2.4 | 28 | 1.8 | 24 |
| 16 | 58.0 | 0.2 | 2.6 | 27 | 2.5 | 24 |
| 17 | 52.0 | 0.5 | 3.3 | 29 | 3.1 | 27 |
| 18 | 31.0 | 0.1 | 2.1 | 25 | 2.6 | 21 |
| 19 | 19.0 | 0.1 | 2.4 | 48 | 2.9 | 44 |
| 20 | 69.0 | 0.1 | 4.4 | 27 | 4.0 | 24 |
| 21 | 61.0 | 0.1 | 2.5 | 24 | 2.4 | 23 |
| 22 | 59.0 | 0.1 | 2.1 | 27 | 1.9 | 20 |
| 23 | 48.0 | 0.1 | 2.2 | 25 | 2.1 | 21 |
| 24 | 0.3 | 0.0 | 55.0 | 68 | 25.0 | 55 |
| 25 | 4.0 | 0.0 | 24.0 | 170 | 12.0 | 130 |
| 26 | 0.3 | 0.0 | 68.0 | 53 | 23.0 | 48 |
| 27 | 0.2 | 0.0 | 37.0 | 140 | 18.0 | 96 |

As is apparent from the results of Table 10, all samples No. 2 to 7, 9 to 12, 14 to 18 and 20 to 23 as the ceramic material of the present invention maintained the thermal conductivity of not less than 20 W/mK and had high corrosion resistance of not more than 5 nm/min. to any of chlorinous gas and chlorinous plasma.

The samples Nos. 3–6 or 15–17 exhibited particularly high corrosion resistance of not more than 3 nm/min. to any of fluorine and chlorine plasmas in case where the porosity is not more than 0.2%.

In the case of the samples Nos. 1 and 13 wherein the content of the rare-earth-containing compound is smaller than a predetermined amount, the ceramic matrix could not be protected from corrosive plasma and the corrosion proceeded. On the other hand, when the content of the rare-earth-containing compound exceeds 60% by volume like the samples Nos. 8 and 19, the thermal conductivity of the ceramic matrix is drastically inhibited and the thermal conductivity of ceramics was lowered to 20 W/mK or less.

In case where the ceramic matrix is $SiO_2$ having low corrosion resistance, the effect of improving the corrosion resistance is poor even if the rare-earth-containing compound is added and the thermal conductivity of $SiO_2$ itself is smaller than 30 W/mK. Therefore, the thermal conductivity of ceramics containing the rare-earth-containing compound-dispersed therein was not larger than 20 W/mK.

As described above in detail, regarding the member constituting the chamber for production of a semiconductor in the present invention, the corrosion resistance of the member to be exposed to halogenous-corrosive gases or plasma thereof is improved and the thermal conductivity is maintained at a fixed level or higher by dispersing a predetermined amount of a crystalline rare-earth-containing compound in a high temperature-conductive ceramic matrix, thereby enhancing the effect of preventing a deposit from accumulating. Furthermore, the corrosion resistance to plasma can be improved by controlling the porosity to 0.2% or less.

What is claimed is:

1. A ceramic member having a resistance to halogen plasma, comprising not less than 10% by volume of a phase of yttrium-aluminum-garnet and not more than 90% by volume of at least a phase of aluminum oxide, which is formed of a sintered material containing as a main component any one of a combination of both crystalline phases of yttrium oxide and yttrium-aluminum-garnet, a combination of both crystalline phases of aluminum oxide and yttrium-aluminum-garnet, wherein the sintered material contains zirconium oxide as a secondary component;

and wherein the content of zirconium oxide is within a range of 0.05 to 5.0% by weight in the sintered material.

2. The ceramic member according to claim 1, wherein the sintered material includes cerium oxide in an amount sufficient to stabilize said zirconium oxide.

3. The ceramic member according to claim 1, wherein the ceramic member shows a thermal-shock resistance temperature $\Delta T$ of not less than 100° C.

4. The ceramic member according to claim 1, wherein a mean grain size of yttrium-aluminum-garnet is not more than 10 $\mu$m.

5. The ceramic member according to claim 1, wherein a porosity of the sintered material is not more than 0.2%.

6. A ceramic member having a resistance to halogen plasma, comprising not less than 10% by volume of a phase of yttrium-aluminum-garnet and not more than 90% by volume of at least a phase of aluminum oxide, which is formed of a sintered material containing as a main component any one of a combination of both crystalline phases of yttrium oxide and yttrium-aluminum-garnet, a combination of both crystalline phases of aluminum oxide and yttrium-aluminum-garnet, wherein the sintered material contains cerium oxide as a secondary component;

and wherein the content of cerium oxide is within a range of 0.0003 to 1.0% by weight in the sintered material.

* * * * *